(12) United States Patent
Okamoto et al.

(10) Patent No.: US 10,680,482 B2
(45) Date of Patent: Jun. 9, 2020

(54) STATOR, MOTOR, AND COMPRESSOR

(71) Applicant: NIDEC CORPORATION, Minami-ku Kyoto (JP)

(72) Inventors: Toshiya Okamoto, Minami-ku Kyoto (JP); Shota Kawashima, Minami-ku Kyoto (JP); Masato Aono, Minami-ku Kyoto (JP); Takayuki Migita, Minami-ku Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 120 days.

(21) Appl. No.: 16/058,324

(22) Filed: Aug. 8, 2018

(65) Prior Publication Data

US 2018/0351428 A1  Dec. 6, 2018

Related U.S. Application Data

(63) Continuation of application No. PCT/JP2017/004424, filed on Feb. 7, 2017.

(30) Foreign Application Priority Data

Feb. 8, 2016 (JP) .................................. 2016-021893

(51) Int. Cl.
*H02K 3/52* (2006.01)
*H02K 5/22* (2006.01)
(Continued)

(52) U.S. Cl.
CPC .............. *H02K 3/522* (2013.01); *H02K 1/146* (2013.01); *H02K 1/274* (2013.01); *H02K 3/18* (2013.01);
(Continued)

(58) Field of Classification Search
CPC .. H02K 3/00; H02K 3/12; H02K 3/18; H02K 3/22; H02K 3/225; H02K 3/28;
(Continued)

(56) References Cited

U.S. PATENT DOCUMENTS

| | | | | |
|---|---|---|---|---|
| 8,546,992 B2 * | 10/2013 | Hsu | ........................ | H02K 3/325 |
| | | | | 310/215 |
| 2009/0121566 A1 * | 5/2009 | Ishizeki | ................. | H02K 1/148 |
| | | | | 310/71 |

(Continued)

FOREIGN PATENT DOCUMENTS

| | | | | |
|---|---|---|---|---|
| JP | 02101940 | * | 4/1990 | ............... H02K 3/38 |
| JP | H11234942 A | | 8/1999 | |

(Continued)

OTHER PUBLICATIONS

CNIPA Office Action corresponding to Application No. 201780010376.2; dated Aug. 29, 2019.

(Continued)

*Primary Examiner* — Tran N Nguyen
(74) *Attorney, Agent, or Firm* — Cantor Colburn LLP

(57) ABSTRACT

A stator includes a plurality of lead wires extending upward from a coil and a guide member supporting the lead wire above the coil. The guide member is an insulating body. The guide member includes a lower plate, an inner wall, and an upper plate. The lower plate spreads annularly around a central axis. The inner wall extends upward from an inner circumference of the lower plate. The upper plate extends from the inner wall to a radial outside. A single lead wire accommodation space exists on an upper side of the lower plate, a lower side of the upper plate, and a radial outside of the inner wall. The plurality of lead wires are circumferentially disposed along the inner wall in the lead wire accommodation space.

23 Claims, 13 Drawing Sheets

(51) Int. Cl.
H02K 3/28 (2006.01)
H02K 1/14 (2006.01)
H02K 1/27 (2006.01)
H02K 3/18 (2006.01)
H02K 3/30 (2006.01)
H02K 3/32 (2006.01)
H02K 7/14 (2006.01)
H02K 5/12 (2006.01)
B60H 1/32 (2006.01)

(52) U.S. Cl.
CPC ............ H02K 3/28 (2013.01); H02K 3/30 (2013.01); H02K 3/325 (2013.01); H02K 5/225 (2013.01); H02K 7/14 (2013.01); *B60H 1/3222* (2013.01); *H02K 5/12* (2013.01); *H02K 2203/06* (2013.01)

(58) Field of Classification Search
CPC ............ H02K 3/30; H02K 3/32; H02K 3/325; H02K 3/34; H02K 3/345; H02K 3/38; H02K 3/50; H02K 3/52; H02K 3/522; H02K 5/00; H02K 5/16; H02K 5/161; H02K 5/22; H02K 5/225; H02K 15/00; H02K 15/007; H02K 15/0075; H02K 15/04; H02K 15/06; H02K 15/065
See application file for complete search history.

(56) References Cited

U.S. PATENT DOCUMENTS

2013/0162072 A1* 6/2013 Mizutani ............... H02K 3/522
310/71
2014/0232212 A1* 8/2014 Miyamoto ............. H02K 3/38
310/43

FOREIGN PATENT DOCUMENTS

| JP | 2002247792 A | 8/2002 |
|---|---|---|
| JP | 3414944 B2 | 6/2003 |
| JP | 2007159192 A | 6/2007 |
| JP | 5232618 B2 | 7/2013 |
| JP | 2013146157 A | 7/2013 |
| JP | 2014187797 A | 10/2014 |
| KR | 20140095798 A | 8/2014 |

OTHER PUBLICATIONS

International Search Report corresponding to Application No. PCT/JP2017/004424; dated Apr. 4, 2017.

* cited by examiner

STATOR, MOTOR, AND COMPRESSOR

CROSS REFERENCE TO RELATED APPLICATIONS

This application is a bypass continuation under 35 U.S.C. § 120 of PCT/JP2017/004424, filed Feb. 7, 2017, which is incorporated herein reference and which claimed priority to Japanese Application No. 2016-021893, filed Feb. 8, 2016. The present application likewise claims priority under 35 U.S.C. § 119 to Japanese Application No. 2016-021893, filed Feb. 8, 2016, the entire content of which is also incorporated herein by reference.

FIELD OF THE INVENTION

The present invention relates to a stator, a motor, and a compressor.

DESCRIPTION OF THE RELATED ART

In recent years, there is a demand for miniaturization and thinning of motors. In order to miniaturize a motor, for example, it is conceivable to reduce a gap between components in the motor. However, in a stator of the motor, when the gap between the components is decreased, there is a possibility that a conducting wire drawn from a coil comes into contact with the coil, a metal case, or the like to generate a short circuit. For this reason, in the motor, it is necessary to dispose an insulating member between the conducting wire drawn out from the coil and another conductive member.

In some cases, however, a size in the axial direction of the stator is enlarged, and the whole motor is hardly miniaturized. In addition, the number of steps of manufacturing the stator may increase.

Therefore, required is a structure of a stator in which, while the insulation from the coil is secured, the lead wire can compactly be disposed without requiring a bus bar.

SUMMARY OF THE INVENTION

According to one aspect of the present invention, a stator used for an inner rotor type motor, the stator includes: a stator core including an annular core back surrounding a vertically extending central axis and a plurality of teeth extending from the core back to a radial inside; a plurality of coils constructed with conducting wires wound around the teeth; an insulator that is an insulating body insulating the stator core from the coil; a plurality of lead wires extending upward from the coil; and a guide member supporting the lead wire on an upper side of the coil. The guide member is an insulating body including: a lower plate spreading annularly around the central axis; an inner wall extending upward from an inner circumference of the lower plate; and an upper plate extending from the inner wall to a radial outside, a single lead wire accommodation space exists on an upper side of the lower plate, a lower side of the upper plate, and a radial outside of the inner wall, and the plurality of lead wires are disposed in a circumferential direction along the inner wall in the lead wire accommodation space.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Hereinafter, an exemplary embodiment of the present invention will be described with reference to the drawings. In the present application, a direction parallel to a central axis of a motor is referred to as an "axial direction", a direction orthogonal to the central axis of the motor is referred to as a "radial direction", and a direction along a circular arc with the central axis of the motor as a center is referred to as a "circumferential direction". However, the above "a direction parallel to" also includes a substantially parallel direction. The above "a direction orthogonal to" also includes a substantially orthogonal direction.

In the present application, a shape and a positional relationship of each component will be described with the axial direction as a vertical direction and with a guide member side as an upside with respect to the coil. However, the definition of the vertical direction is not intended to limit an orientation of a stator, the motor, and a compressor according to the present invention during manufacturing and use.

Figure 1:
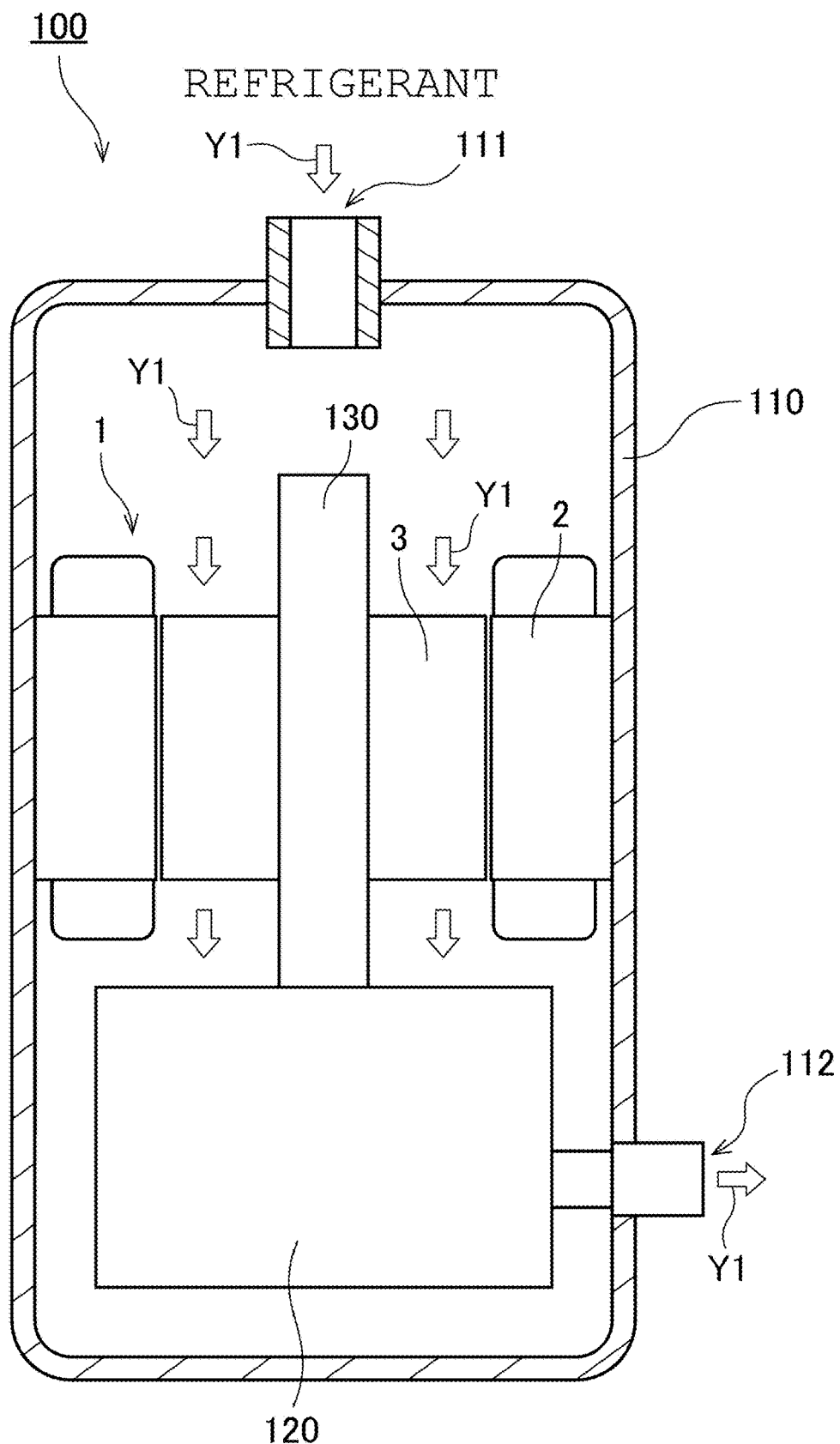
FIG. 1 is a schematic diagram of a compressor.

FIG. 1 is a schematic diagram illustrating a compressor 100 according to an embodiment of the present invention. The compressor 100 is an electric type device operated by driving force of a motor 1. When the compressor 100 is operated, gas that is a refrigerant is compressed. For example, the compressor 100 is used for an air conditioner of an automobile. As illustrated in FIG. 1, the compressor 100 includes a casing 110, a compression mechanism 120, the motor 1, and a control device (not illustrated).

The casing 110 has a suction port 111 provided in an upper portion and a discharge port 112 provided in a side portion. The compression mechanism 120 and the motor 1 are accommodated in the casing 110. The compression mechanism 120 and the motor 1 are connected to each other via a shaft 130. When the motor 1 is driven, the shaft 130 is rotated by the driving force of the motor 1. The rotation of the shaft 130 operates the compression mechanism 120.

In driving the compressor 100, as indicated by an arrow Y1 in FIG. 1, the low-temperature and low-pressure refrigerant is sucked into an inner space of the casing 110 through the suction port 111. The sucked refrigerant is compressed by the compression mechanism 120 in the casing 110. The compressed refrigerant having high temperature and high pressure is discharged to an outside of the casing 110 through the discharge port 112.

Figure 2:
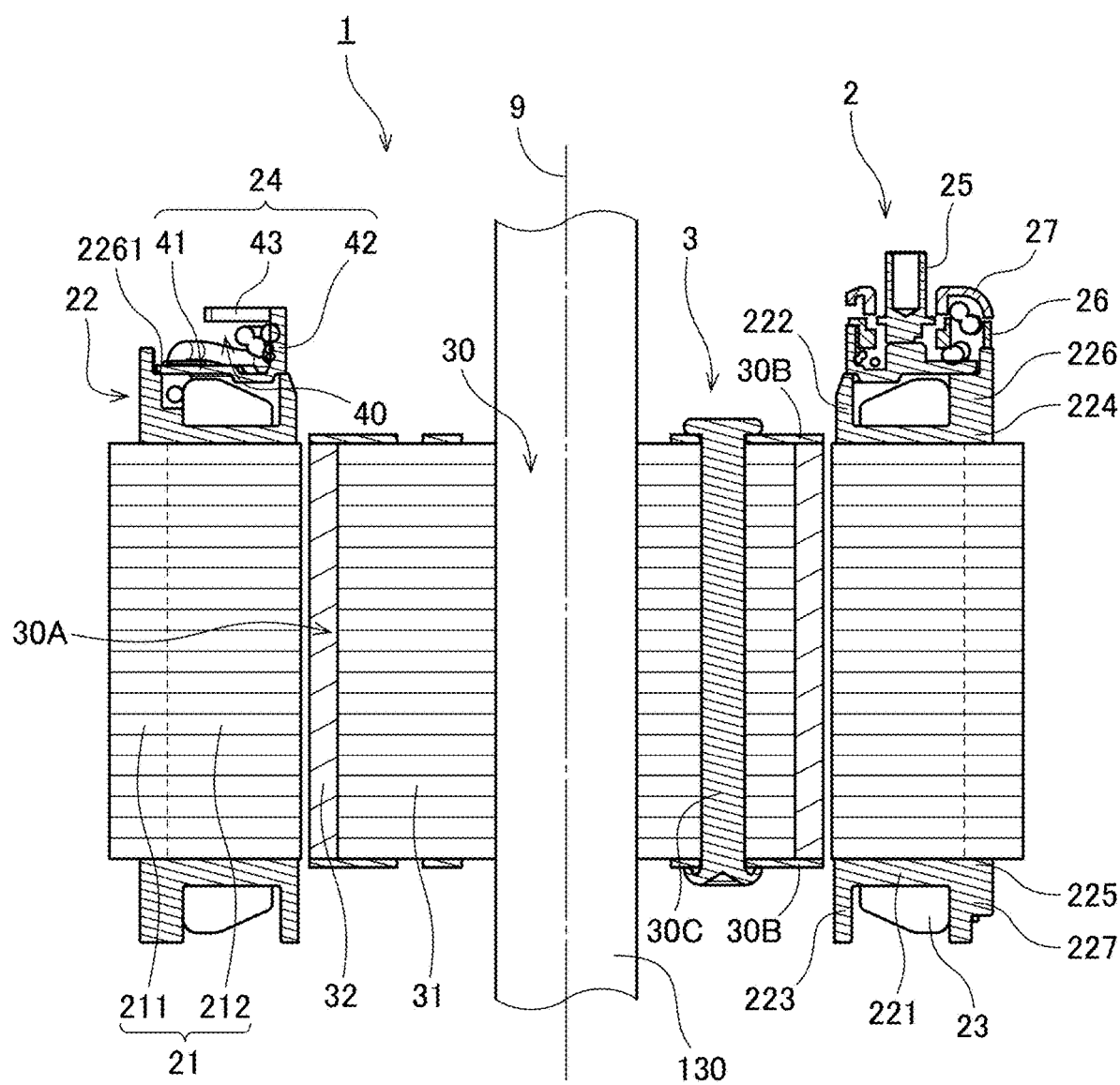
FIG. 2 is a longitudinal sectional view of a motor.
Figure 3:
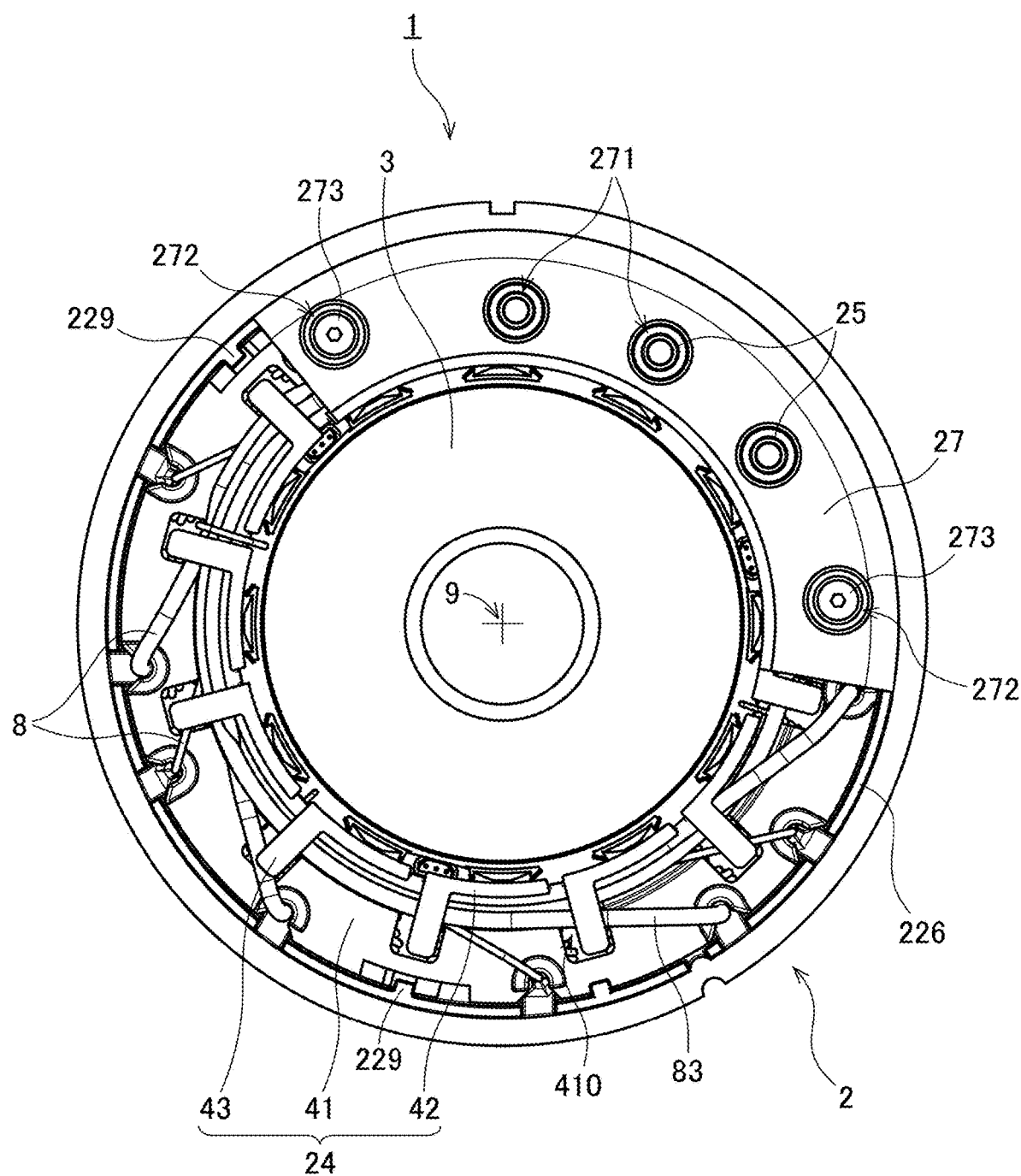
FIG. 3 is a plan view of the motor.
Figure 4:
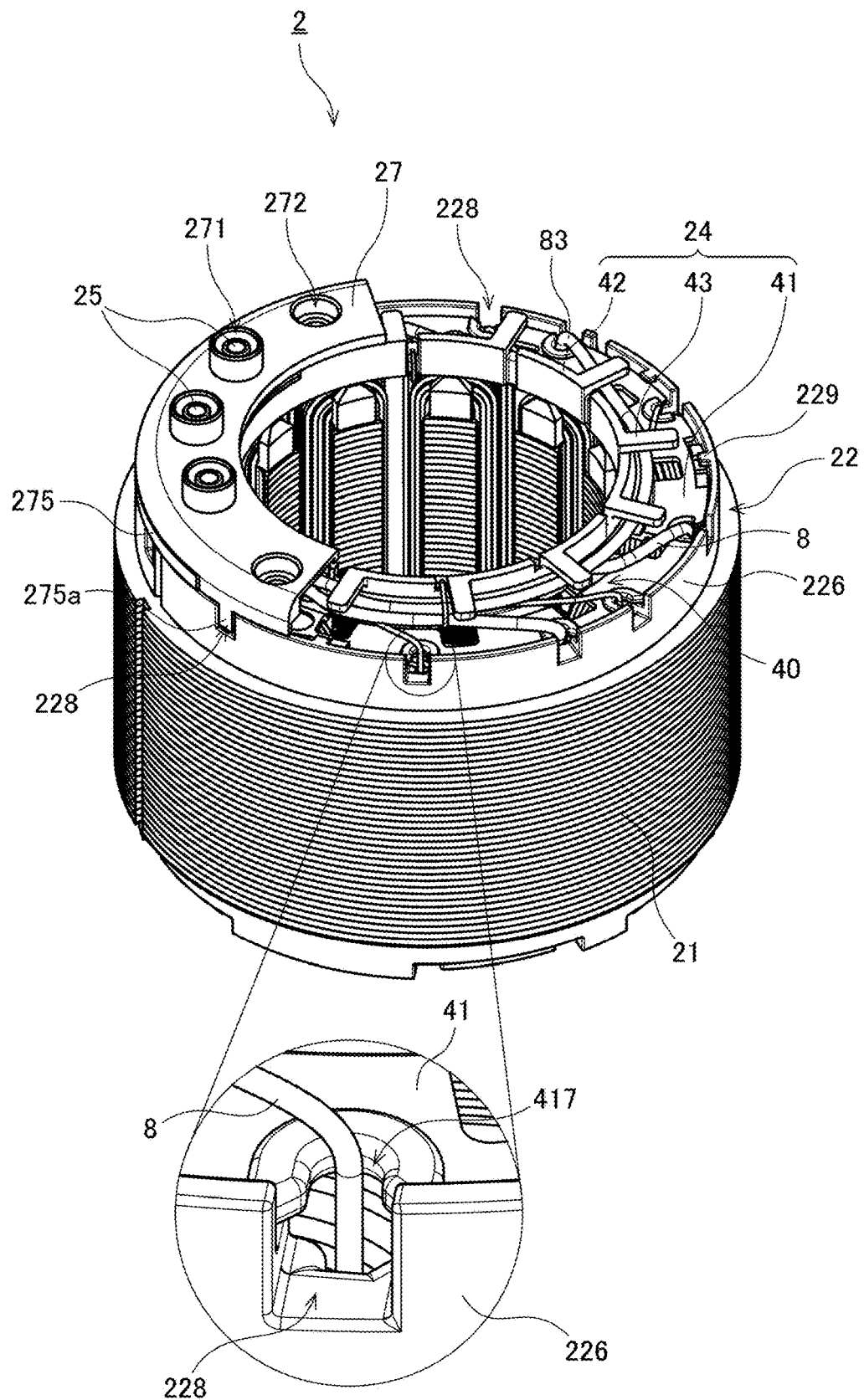
FIG. 4 is a perspective view of a stator.

A detailed structure of the motor 1 will be described below. FIG. 2 is a longitudinal sectional view of the motor 1. FIG. 3 is a plan view of the motor 1. FIG. 4 is a perspective view of a stator 2. The motor 1 is what is called an inner rotor type motor including the annular stator 2 and a rotor 3 disposed on a radial inside of the stator 2. The stator 2 is fixed to the casing 110 of the compressor 100. The rotor 3 is rotatably supported with respect to the casing 110 by bearings (not illustrated). In driving the motor 1, the rotor 3 rotates about a central axis 9.

As illustrated in FIG. 2 to FIG. 4, the stator 2 includes a stator core 21, an insulator 22, a plurality of coils 23, a guide member 24, three connection terminals 25, a spacer 26 (case bottom), and a cover member 27 (case body). In order to electrically connect a control device of the compressor 100 and the motor 1, the three connection terminals 25 are connected to external connection terminals provided in the control device. That is, the connection terminal 25 is connected to the external connection terminal provided separately from the motor 1.

The stator core 21 is a single laminated body formed by laminating electromagnetic steel plates. The stator core 21 includes a core back 211 and a plurality of (twelve in this example) teeth 212. The core back 211 annularly surrounds the central axis 9. An outer circumferential face of the core back 211 is fixed to the inner circumferential face of the casing 110. Each of the plurality of teeth 212 extends radially inward from the core back 211. The plurality of teeth 212 are arranged at equal intervals in a circumferential direction.

The stator core 21 may be formed by combining a plurality of laminated bodies. For example, the stator core 21 may be formed by combining the core back 211 and the teeth 212, which are different members.

The insulator 22 is made of resin which is an insulating body. The insulator 22 includes a plurality of insulating portions 221, a plurality of upper inner walls 222, a plurality of lower inner walls 223, an upper annular portion 224, a lower annular portion 225, an upper outer wall 226, and a lower outer wall 227. The plurality of insulating portions 221 are provided in each of the teeth 212. The insulating portion 221 covers a top face, a bottom face, and both circumferential end faces of each of the teeth 212. The plurality of upper inner walls 222 extend upward from an end on the radial inside of the insulating portion 221. The plurality of lower inner walls 223 extend downward from the end of the radial inside of the insulating portion 221.

The upper annular portion 224 is an annular portion located on the top face of the core back 211. At least a part of the top face of the core back 211 (in this example, a region excluding an outer circumferential edge of the top face of the core back 211) is covered with the upper annular portion 224. The lower annular portion 225 is an annular portion located on the bottom face of the core back 211. At least a part of the bottom face of the core back 211 (in this example, a region excluding the outer peripheral edge of the bottom face of the core back 211) is covered with the lower annular portion 225.

The upper outer wall 226 extends upward from the upper annular portion 224. The upper outer wall 226 has a cylindrical shape, and spreads on an upper side of the core back 211. The upper outer wall 226 includes a step face 2261 extending perpendicular to an axial direction on the radial inside. The upper outer wall 226 includes a plurality of notches 228 (first notches), which is recessed downward from an upper end and penetrates in the radial direction. The plurality of notches 228 are provided at intervals in the circumferential direction. The lower outer wall 227 extends downward from the lower annular portion 225.

The coil 23 is constructed with a conducting wire wound around the insulating portion 221. That is, the conducting wire is wound around the teeth 212 constituting a magnetic core with the insulating portion 221 interposed therebetween. The insulating portion 221 is interposed between the teeth 212 and the coil 23 to insulate the teeth 212 from the coil 23. The coil 23 is disposed between the upper inner wall 222 and the lower inner wall 223, and between the upper outer wall 226 and the lower outer wall 227. Consequently, winding collapse of the coil 23 is prevented.

Figure 5:
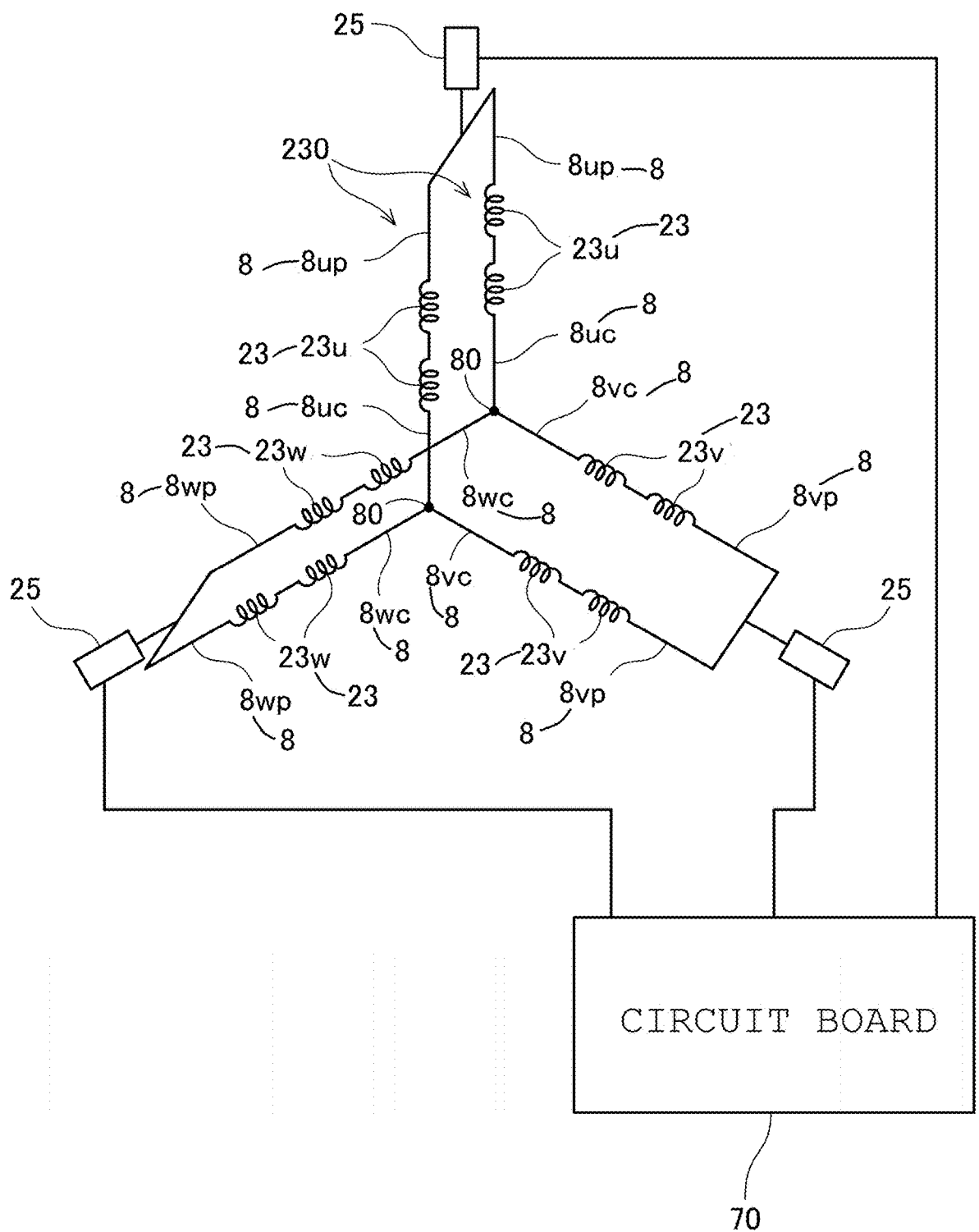
FIG. 5 is a view conceptually illustrating connection of coils.

The motor 1 is a three-phase synchronous motor driven by three-phase alternating current of a U-phase, a V-phase and a W-phase. Consequently, the plurality (twelve in the present example) of coils 23 include a plurality (four in the present example) of U-phase coils 23$u$ to which a U-phase current is supplied, a plurality (four in this example) of V-phase coils 23$v$ to which a V-phase current is supplied, and a plurality (four in this example) of W-phase coils 23$w$ to which a W-phase current is supplied. FIG. 5 is a view conceptually illustrating connection of the coils 23. As illustrated in FIG. 5, in this example, two U-phase coils 23$u$, two V-phase coils 23$v$, and two W-phase coils 23$w$ are connected by star connection, to form a set of coil groups 230. Two sets of coil groups 230 are connected in parallel. The star connection is suitable for rotation with high efficiency at a high speed (for example 2000 to 8000 rpm) like an air conditioner for an automobile because current can efficiently be passed compared with other connection methods.

The two U-phase coils 23$u$ connected to one neutral point 80 are formed by one conducting wire. The two V-phase coils 23$v$ connected to one neutral point 80 are formed by one conducting wire. The two W-phase coils 23$w$ connected to one neutral point 80 are formed by one conducting wire. Thus, one neutral point 80 in one set of coil groups 230 is formed by collectively connecting one ends of the coils 23$u$, 23$v$, 23$w$. The other ends of the coils 23$u$, 23$v$, 23$w$ connected to the neutral point 80 are connected to the other ends of the in-phase coils 23$u$, 23$v$, 23$w$ of the other coil group 230, and connected to one connection terminal 25. Thus, the three conducting wires drawn from the two sets of coil groups 230 are connected to an external power supply.

Both ends of each conducting wire are drawn upward from the coil 23. Hereinafter, a conducting wire drawn upward from the coil 23 is referred to as a "lead wire 8". In particular, among the lead wires 8 drawn from the U-phase coil 23$u$, the lead wire 8 on the side of the neutral point 80 is referred to as a U-phase common line 8$uc$, and the lead wire 8 on the power supply side is referred to as a U-phase feeder line 8$up$. Among the lead wires 8 drawn from the V-phase coil 23$v$, the lead wire 8 on the side of the neutral point 80 is referred to as a V-phase common line 8$vc$, and the lead wire 8 on the power supply side is referred to as a V-phase feeder line 8$vp$. Among the lead wires 8 drawn out from the W-phase coil 23$w$, the lead wire 8 on the side of the neutral point 80 is referred to as a W-phase common line 8$wc$, and the lead wire 8 on the power supply side is referred to as a W-phase feeder line 8$wp$.

The feeder lines 8$up$, 8$vp$, and 8$wp$ of the respective phases, which are parts of the plurality of lead wires 8, are covered with an insulating tube 83 made of an insulating material. Consequently, the feeder lines 8$up$, 8$vp$, and 8$wp$ of the respective phase can be prevented from contacting each other to be electrically short-circuited. In the common lines 8*uc*, 8*vc*, and 8*wc* of the respective phases, only a part including the neutral point 80 is covered with the insulating tube 83.

Figure 6:
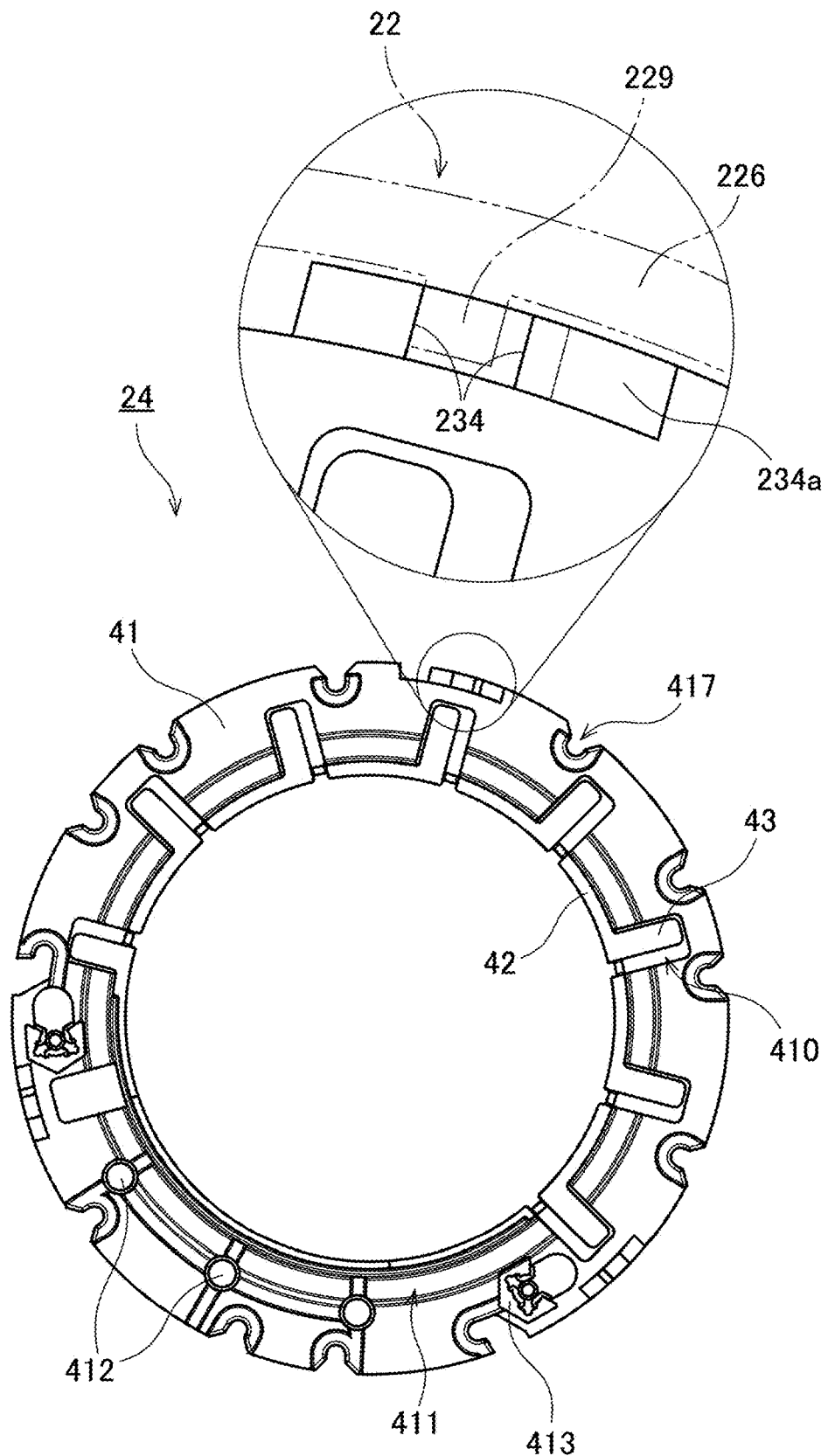
FIG. 6 is a plan view of a guide member.
Figure 7:
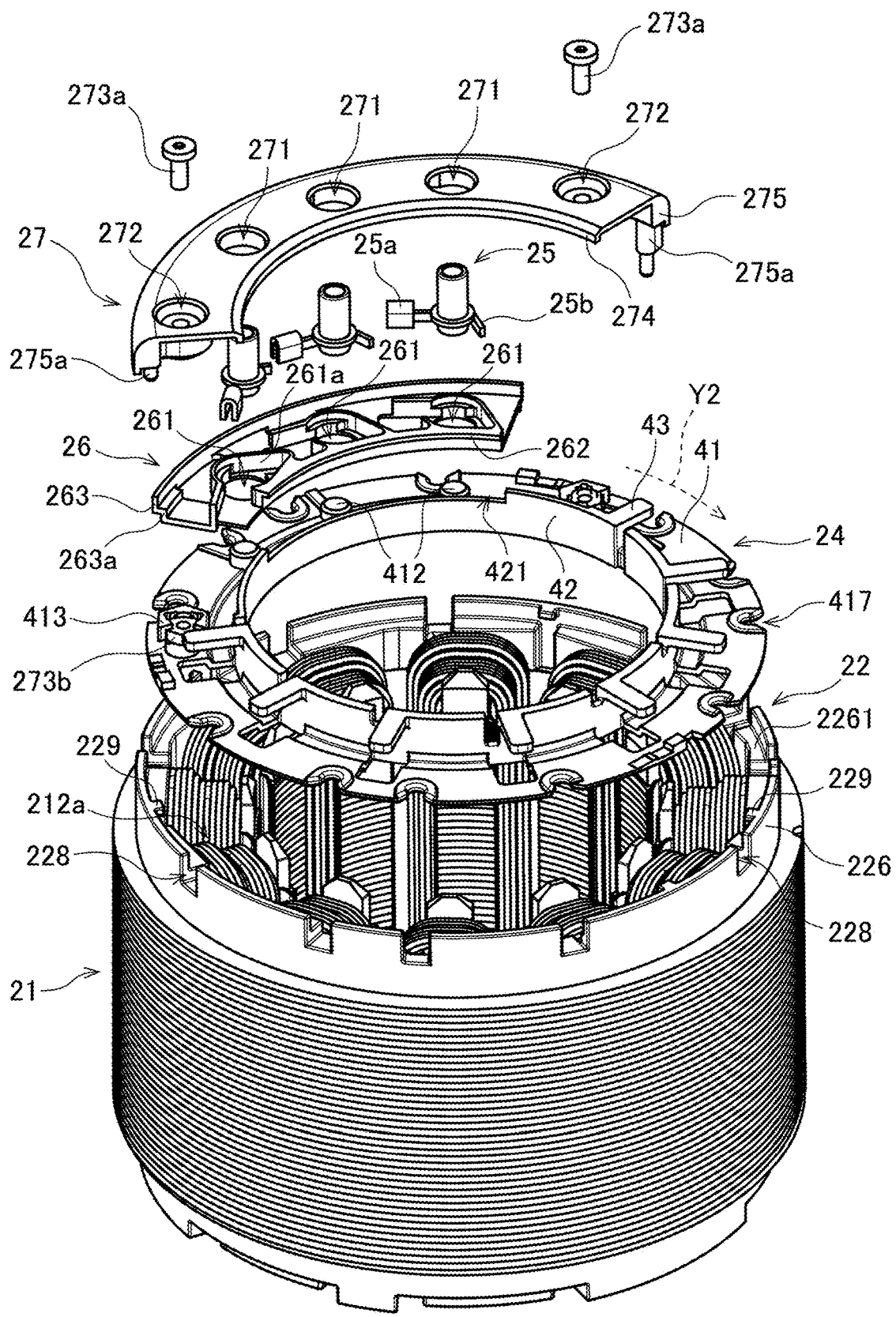
FIG. 7 is an exploded perspective view of the stator.

FIG. 6 is a plan view of the guide member 24. FIG. 7 is an exploded perspective view illustrating the stator 2 in which the lead wire 8 is omitted. As illustrated in FIG. 4, FIG. 6, and FIG. 7, the guide member 24 is an annular member located above the plurality of coils 23. The plurality of lead wires 8 drawn from the plurality of coils 23 are held by the guide member 24. The three connection terminals 25, the spacer 26, and the cover member 27 are disposed on the guide member 24. The connection terminal 25 is made of metal, such as copper, which is a conductor. The three connection terminals 25 are connected to the U-phase feeder line 8*up*, the V-phase feeder line 8*vp*, and the W-phase feeder line 8*wp* out of the plurality of lead wires 8. As illustrated in FIG. 5, the three connection terminals 25 are electrically connected to a circuit board 70 that supplies a driving current. The circuit board 70 constitutes a part of the control device.

Each of the guide member 24, the spacer 26, and the cover member 27 is made of resin which is an insulating body. In particular, in the present embodiment, these members are exposed to the refrigerant in driving the compressor 100. Consequently, a material having high refrigerant resistance is preferably used as a material for the guide member 24, the spacer 26, and the cover member 27. For example, polyphenylene sulfide (PPS), liquid crystal polymer (LCP), or polybutylene terephthalate (PBT) may be used as a material for the guide member 24, the spacer 26 and the cover member 27. The guide member 24, the spacer 26, and the cover member 27 may be made of the same material or different materials.

More detailed structures of the guide member 24, the three connection terminals 25, the spacer 26, and the cover member 27 will be described later.

The rotor 3 of the present embodiment includes a rotor core 31 and a plurality of magnets 32.

The rotor core 31 is a laminated body formed by laminating electromagnetic steel plates. The rotor core 31 includes an insertion hole 30 and a plurality of magnet accommodation portions 30A. The insertion hole 30 pierces the laminated body in the axial direction at the center of the rotor core 31. The plurality of magnet accommodation portions 30A are located on a radial outside of the insertion hole 30. The shaft 130 is press-fitted into the insertion hole 30 of the rotor core 31. Consequently, the rotor core 31 and the shaft 130 are fixed to each other.

The plurality of magnets 32 are arranged on the outer circumferential face of the rotor core 31 so as to oppose the teeth 212 of the stator 2 in the radial direction. The plurality of magnets 32 are sandwiched between end plates 30B provided on end faces of the rotor core 31. In the end plate 30B, the rotor core 31 is fixed by a rivet 30C.

In driving the motor 1, the U-phase current, the V-phase current, and the W-phase current are supplied to the U-phase feeder line 8*up*, the V-phase feeder line 8*vp*, and the W-phase feeder line 8*wp* from the external power source through the circuit board 70 and the connection terminal 25. This enables a rotating magnetic field to be generated in the plurality of teeth 212 of the stator core 21. Consequently, circumferential torque is generated between the teeth 212 and the magnets 32. As a result, the rotor 3 rotates about the central axis 9 with respect to the stator 2.

The more detailed structures of the guide member 24, the three connection terminals 25, the spacer 26, and the cover member 27 will be described below.

As illustrated in FIG. 2 to FIG. 4, FIG. 6, and FIG. 7, the guide member 24 includes a lower plate 41, an inner wall 42, and a plurality of upper plates 43. The lower plate 41 spreads in an annular shape and a plate shape around the central axis 9. The inner wall 42 extends in a cylindrical shape from the inner circumferential portion of the lower plate 41 toward the upper side. However, the entire circumferential portion of the inner wall 42 is not necessarily continuous. For example, a plurality of arc-shaped inner walls 42 extending from the inner circumferential portion of the lower plate 41 to the upper side may be arranged at intervals in the circumferential direction. The plurality of upper plates 43 extend radially outward from the upper portion of the inner wall 42. In the present embodiment, the plurality of upper plates 43 are arranged at equal intervals in the circumferential direction. However, the upper plate 43 is omitted in the circumferential position where the spacer 26 and the cover member 27, which will be described later, are disposed.

The guide member 24 includes a lead wire accommodation space 40 that is a single arc-shaped space formed by the upper side of the lower plate 41, the lower side of the plurality of upper plates 43, and the radial outside of the inner wall 42. At this point, there is a gap between the lower plate 41 and a part of the inner wall 42 or between the adjacent upper plates 43, and the space formed by the gap is also included in the lead wire accommodation space 40. The plurality of lead wires 8 are wound around the inner wall 42. Consequently, the plurality of lead wires 8 are arranged in the single lead wire accommodation space 40 in the circumferential direction along the outer circumferential face of the inner wall 42. The guide member 24 is disposed between the upper inner wall 222 and the upper outer wall 226, and fixed to the insulator 22 by a fixing method to be described later. At this point, the lower plate 41 of the guide member 24 abuts on the step face 2261 of the insulator 22.

The lower plate 41 is interposed between the plurality of lead wires 8 arranged in the lead wire accommodation space 40 and the plurality of coils 23. Consequently, the coil 23 and the lead wire 8 are insulated from each other. The plurality of upper plates 43 are arranged on the upper side of the lead wire 8, so that extrusion of the lead wire 8 to the upper side is prevented. The inner wall 42 is disposed on the radial inside of the lead wire 8, so that the extrusion of the lead wire 8 to the radial inside is prevented. In this manner, the plurality of lead wires 8 can compactly be arranged on the upper side of the stator 2 by accommodating the lead wire 8 in the single lead wire accommodation space 40.

The plurality of lead wires 8 are drawn from different regions in the circumferential direction of the stator core 21. At this point, because the lead wire accommodation space 40 exists in the arc shape, the lead wire 8 is easily disposed in the lead wire accommodation space 40 even if the lead wire 8 is drawn from any region. Even if the lead wire accommodation space 40 is not located on the radial inside of the region from which the lead wire 8 is drawn, the lead wire 8 can easily be guided to the lead wire accommodation space 40 along the inner wall 42 of the guide member 24.

That is, the use of the guide member 24 can dispose the plurality of lead wires 8 without largely protruding to the upper side, the radial inside, and the radial outside of the stator 2 while securing the insulation from the stator core 21, so that both the miniaturization of the stator 2 and the insulation of the lead wire 8 can be achieved. The radial outside of the lead wire accommodation space 40 is opened, so that the lead wire 8 drawn from the coil 23 can directly be wound around the inner wall 42. Consequently, the lead wire 8 can easily be disposed in the lead wire accommodation space 40.

In the present embodiment, a groove 411 extending in the circumferential direction is formed in the lower plate 41. At least a part of the plurality of lead wires 8 is arranged in the groove 411. Consequently, positional displacement of the lead wire 8 is prevented. The lead wire 8 can also be prevented from protruding upward from the top face of the lower plate 41. Consequently, a size in the axial direction of the stator 2 can be further decreased. Preferably the upper plate 43 extends to the radial outside beyond the groove 411.

In the present embodiment, the plurality of upper plates 43 are radially arranged with respect to the central axis 9. Specifically, the upper plates 43 as many as the plurality of coils 23 are arranged at equal intervals in the circumferential direction. Thus, as compared with the case that the upper plate spreads continuously in the arc shape, more gaps communicating with the inside and the outside are formed on the upper side of the lead wire accommodation space 40 by radially arranging the plurality of upper plates 43. Consequently, as indicated by the arrow Y1 in FIG. 1, a passage resistance of the refrigerant flowing in the vicinity of the stator 2 in driving the compressor 100 is reduced, and flowability of the refrigerant is improved. Heat dissipation of the stator 2 including the lead wire 8 is also improved. The number of the upper plates 43 of the guide member 24, an interval between the adjacent upper plates 43, and a circumferential width of the upper plate 43 are not limited to the present embodiment.

Among the plurality of lead wires 8, leading ends of the U-phase common line 8*uc*, the V-phase common line 8*vc*, and the W-phase common line 8*wc* are electrically connected to one another by welding. The connection portion is the neutral point 80. In this example, the two neutral points 80 exist because there are the two sets of star-connected coil groups 230. The U-phase common line 8*uc*, the V-phase common line 8*vc*, and the W-phase common line 8*wc* may be connected to one another by another method such as soldering instead of the welding.

The neutral point 80 is disposed on the upper side of the lower plate 41. The neutral point 80 is fixed to a part of the guide member 24 by a first fastening member 81 to be described later. Consequently, movement of the neutral point 80 is restricted. Constant tension is generated in the circumferential direction of each lead wire 8 by winding the plurality of lead wires 8 around the inner wall 42. Frictional force is generated by the contact between each portion of the guide member 24 and the lead wires 8 and the contact between the lead wires 8. Even if the first fastening member 81 is eliminated, the position of the neutral point 80 can sometimes be maintained by the tension or the frictional force. However, the use of the first fastening member 81 can surely fix the position of the neutral point 80 without depending on the tension or the frictional force.

The U-phase feeder line 8*up*, the V-phase feeder line 8*vp*, and the W-phase feeder line 8*wp* are fixed to a part of the guide member 24 by a second fastening member 82 to be described later. Consequently, the movement of the U-phase feeder line 8*up*, the V-phase feeder line 8*vp*, and the W-phase feeder line 8*wp* is restricted. Constant tension is generated in the circumferential direction of each lead wire 8 by winding the plurality of lead wires 8 around the inner wall 42. Frictional force is generated by the contact between each portion of the guide member 24 and the lead wires 8 and the contact between the lead wires 8. Even if the second fastening member 82 is eliminated, the positions of the U-phase feeder line 8*up*, the V-phase feeder line 8*vp*, and the W-phase feeder line 8*wp* can sometimes be maintained by the tension or the frictional force. However, the use of the second fastening member 82 can surely fix the positions of the U-phase feeder line 8*up*, the V-phase feeder line 8*vp*, and the W-phase feeder line 8*wp* without depending on the tension or the frictional force.

A plurality of notches 417 (second notches) are formed in at outer circumferential edge of the lower plate 41 at intervals in the circumferential direction. The notch 417 is recessed radially inward, and pierces in the axial direction. The lower plate 41 is disposed on the inner circumferential face of the upper outer wall 226 of the insulator without forming a gap in the radial direction, so that lead wire 8 is drawn from the lower side to the upper side of the guide member 24 through the notch 417 as illustrated in an enlarged view of FIG. 4.

As illustrated in FIG. 3 and FIG. 6, a plurality of holes 410 are made in the lower plate 41. Each of the plurality of holes 410 pierces the lower plate 41 in the axial direction on the lower side of the upper plate 43. When viewed in the axial direction, an area of the upper plate 43 is smaller than an area of the hole 410. Each of the upper plates 43 overlaps the hole 410 in the axial direction. Because the lower plate 41 includes the hole 410, the passage resistance of the refrigerant flowing in the vicinity of the stator 2 decreases in driving the compressor 100, so that the flowability of the refrigerant is improved. Heat dissipation of the stator 2 including the lead wire 8 is also improved. The shape of the hole 410 and the number of holes 410 may variously be changed as long as there is no inconvenience in terms of an insulation property between the lead wire 8 and the coil 23, holding stability of the lead wire 8, rigidity of the guide member 24, and the like.

Figure 8:
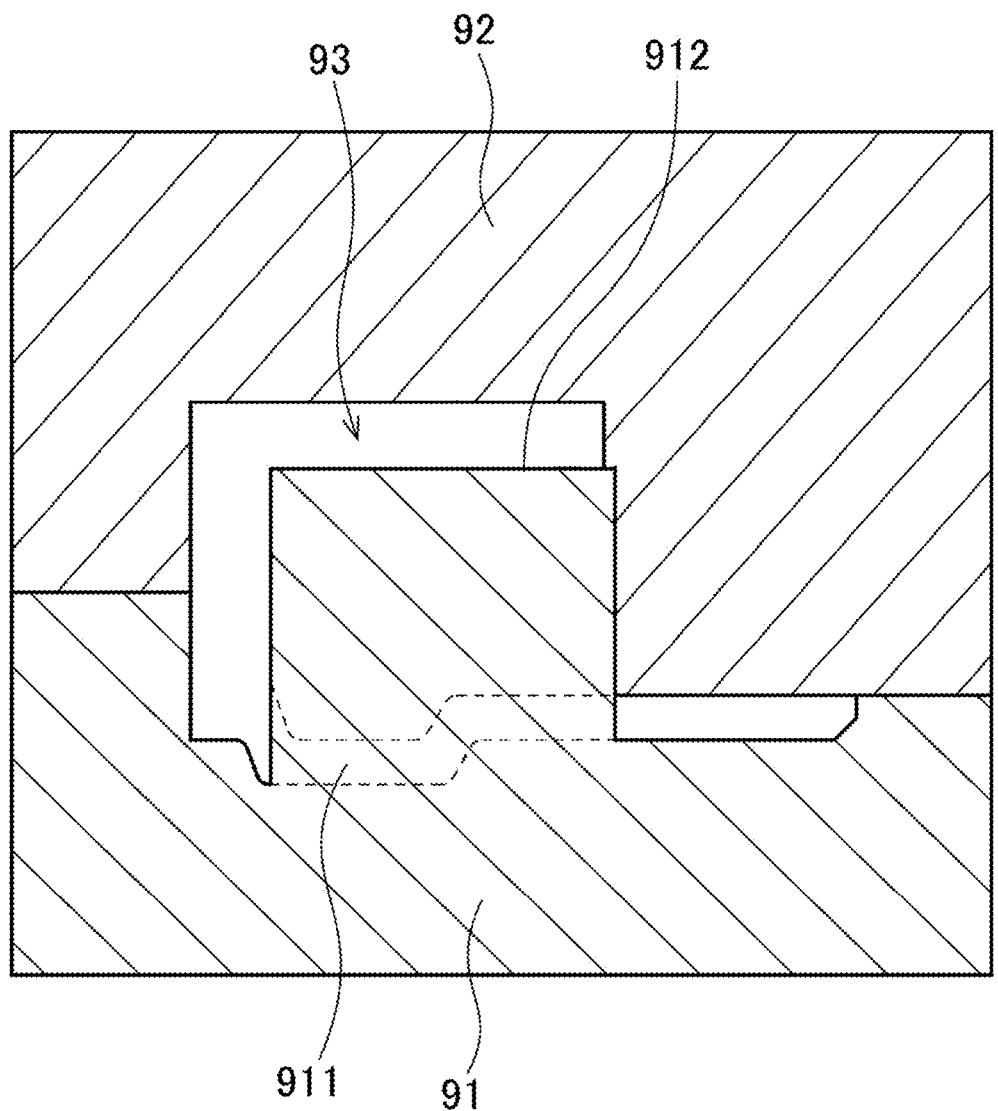
FIG. 8 is a longitudinal sectional view illustrating a metal mold used for injection molding of the guide member.

FIG. 8 is a longitudinal sectional view illustrating a part of a metal mold used for injection molding of the guide member 24. As illustrated in FIG. 8, the guide member 24 is obtained by pouring molten resin into a space 93 formed between a lower metal mold 91 and an upper metal mold 92, and by curing the molten resin. At this point, a part of the lower metal mold 91 is disposed in a portion 911 constituting the hole 410 of the lower plate 41. The bottom face of the upper plate 43 is molded by a surface 912 located above the portion 911 of the lower metal mold 91. After the molten resin is cured, the lower metal mold 91 and the upper metal mold 92 are vertically separated from each other.

In this way, when the hole 410 larger than the upper plate 43 is provided below the upper plate 43, the upper plate 43 can be molded only by the metal mold that moves in a vertical direction. That is, the upper plate 43 can be molded without using a slide metal mold that moves in a lateral direction. Consequently, cost for molding the guide member 24 can be reduced.

Each of the plurality of holes 410 overlaps a teeth gap 212*a*, which is formed between adjacent teeth 212 in the circumferential direction, in the axial direction. As indicated by the arrow Y1 in FIG. 1, the refrigerant flowing in the vicinity of the stator 2 in driving the compressor 100 also flows in the teeth gap 212*a* through the plurality of holes 410. At this point, the passage resistance of the refrigerant is reduced because the hole 410 and the teeth gap 212*a* overlap each other in the axial direction, so that the flowability of the refrigerant is improved. At the same time, the heat generated in the coil 23 is discharged through the refrigerant, and the heat dissipation is also improved when the refrigerant has the good flowability. The heat generation of the stator 2 can be prevented or reduced in this manner, so that the efficiency of the compressor 100 and the motor 1 is improved. The refrigerant flowability is improved, so that compression efficiency of the compressor 100 is also improved.

Particularly, in the present embodiment, the area of the upper plate 43 is smaller than the area of the hole 410 when viewed in the axial direction. Consequently, in planar view, the upper plate 43 does not completely close the upper portion of the hole 410. Thus, the passage resistance of the refrigerant in the hole 410 is further decreased.

The connection terminal 25 is a metal member, which has a bottomed cylindrical shape and extends in the axial direction. The three connection terminals 25 are disposed on the top face of the lower plate 41 of the guide member 24. The U-phase feeder line 8up, the V-phase feeder line 8vp, and the W-phase feeder line 8wp are connected to the three connection terminals 25, respectively. For example, the feeder lines 8up, 8vp, and 8wp are connected to the connection terminal 25 by welding.

Figure 9:
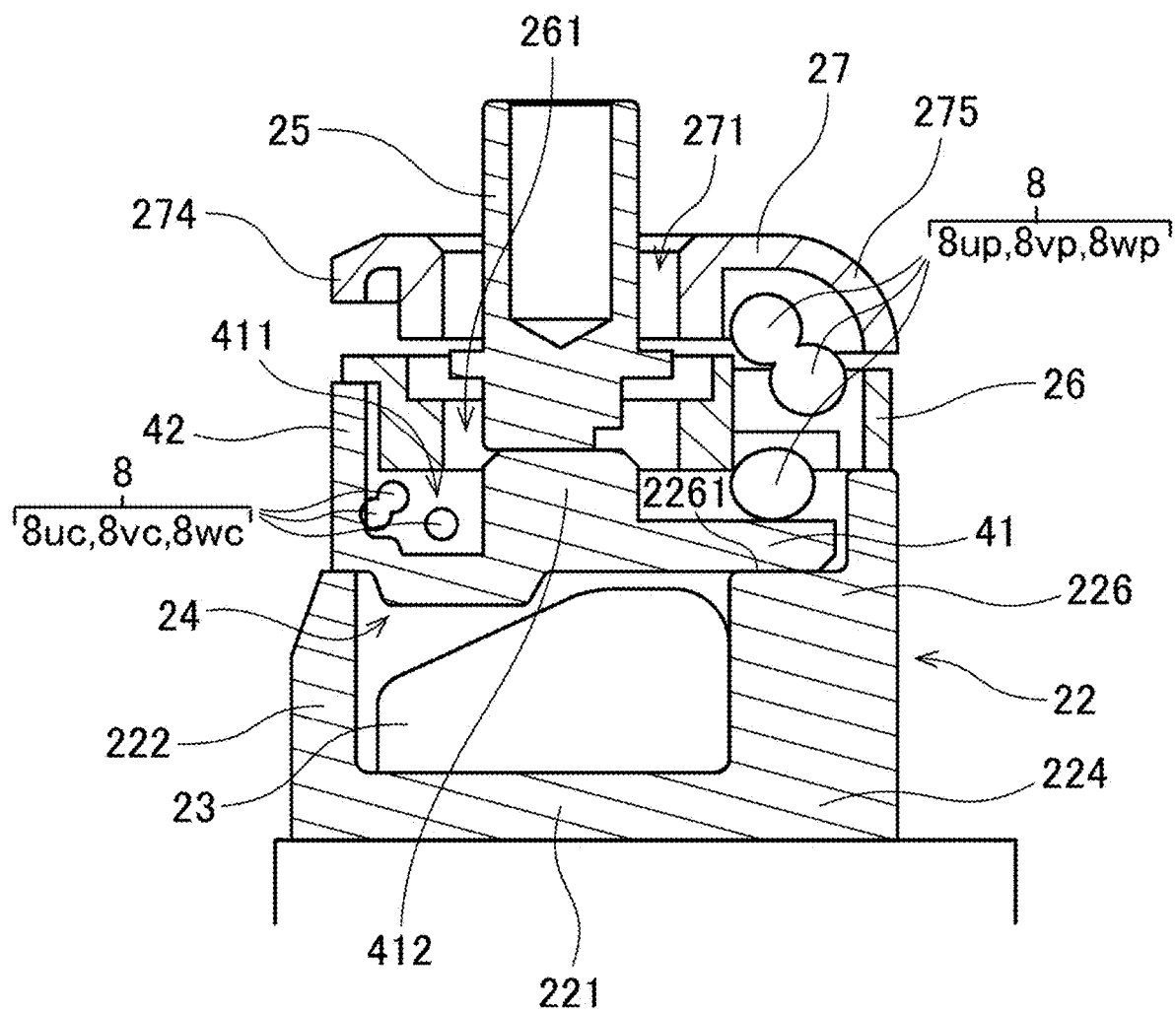
FIG. 9 is a sectional view illustrating a vicinity of the guide member.

FIG. 9 is a sectional view illustrating the vicinity of the guide member 24. As illustrated in FIG. 4, FIG. 7, and FIG. 9, the three connection terminals 25 are held by a terminal case constructed with the spacer 26 and the cover member 27. The terminal case is fixed to the guide member 24.

The spacer 26 has the arc shape along the lower plate 41, and is a resin member spreading in a plate shape having substantially the same width as the lower plate 41. Three through-holes 261 piercing in the axial direction are made in the spacer 26 at intervals in the circumferential direction. The connection terminal 25 is inserted into the through-hole 261. An insulating wall 261a is provided around the through-hole 261 in order to ensure the insulation of the adjacent connection terminal 25. A part of the insulating wall 261a is notched in order to facilitate drawing of the lead wire 8 from the connection terminal 25 inserted in the through-hole 261. On the top face of the lower plate 41, three protrusions 412 projecting upward are provided at intervals in the circumferential direction. The spacer 26 is disposed such that each through-hole 261 overlaps the protrusion 412 in the axial direction. Consequently, the connection terminal 25 abuts on the protrusion 412 through the through-hole 261.

A flange 262 is provided at the inner circumferential edge of the spacer 26. On the other hand, a recess 421 recessed in the axial direction is provided on the upper end of the inner wall 42 of the guide member 24. The flange 262 is fitted in the recess 421. Consequently, the spacer 26 is positioned in the circumferential direction and the axial direction. An outer circumferential wall 263 is provided at the outer circumferential edge of the spacer 26. The outer circumferential wall 263 accommodates the lead wire 8 connected to the connection terminal 25 in the gap (accommodation groove) formed between the outer circumferential wall 263 and a part of the insulating wall 261a. A step 263a provided in a lower portion of the outer circumferential wall 263 abuts on the step face 2261 of the insulator 22. Thus, by disposing the spacer 26 on the upper side of the lower plate 41 through which the lead wire 8 passes, the spacer 26 prevents the extrusion of the lead wire 8, and the spacer 26 holds the three connection terminals 25 while securing the insulation of the three connection terminals 25 from one another.

The cover member 27 has the arc shape along the lower plate 41, and is a resin member spreading in the plate shape having approximately the same width as the lower plate 41. A circumferential length of the cover member 27 slightly protrudes from both ends of the spacer 26. Three through-holes 271 piercing in the axial direction are made in the cover member 27 at positions overlapping the three through-holes 261 of the spacer 26 in the axial direction. Two second through-holes 272 piercing in the axial direction are made in the cover member 27 at both circumferential end sides of the three through holes. The upper side of the second through-hole 272 is recessed. In the cover member 27, an inner circumferential wall 274 is provided at the inner circumferential edge, and an outer circumferential wall 275 is provided at the outer circumferential edge. Both ends in the circumferential direction of the inner circumferential wall 274 abut on the inner wall 42, and other portions except for both the ends face the inner circumferential edge of the spacer 26 with a gap. Both ends in the circumferential direction of the outer circumferential wall 275 abut on the upper outer wall 226 of the insulator 22, and the other portions except for both the ends face the outer circumferential edge of the spacer 26 with a gap. Projections 275a extending downward in the axial direction are provided at both the ends in the circumferential direction of the outer circumferential wall 275. The projection 275a is fitted in the notch 228 of the upper outer wall 226. Consequently, the cover member 27 is positioned in the circumferential direction with respect to the insulator 22.

The cover member 27 is disposed on the upper side of the spacer 26 such that each connection terminal 25 is inserted in the through-hole 271. The connection terminal 25 has a connection portion 25a connecting the lead wire 8 and a projection 25b on the opposite side to the connection portion 25a. The connection portion 25a and the projection 25b project in a direction orthogonal to the axial direction of the connection terminal 25. For this reason, when the cover member 27 is disposed, the connection portion 25a and the projection 25b of the connection terminal 25 are pressed downward in the axial direction by the cover member 27. Consequently, the connection terminal 25 is stably supported by the protrusion 412. The connection terminal 25 has a bottomed cylindrical shape, and the external terminal is inserted in the inside of the connection terminal 25 in the axial direction. Even if tension toward the upper side in the axial direction acts on the connection terminal 25 in withdrawing the external terminal inserted in the connection terminal 25, the connection terminals 25 are not detached from the terminal case. An outer diameter of the connection terminal 25 is smaller than inner diameters of the through-holes 261, 271, so that the connection terminal 25 has play with respect to the through-holes 261, 271. Consequently, even if the axes of the external terminal and the connection terminal 25 are slightly shifted from each other when the external terminal is inserted in the connection terminal 25, the external terminals can smoothly be inserted because the connection terminal 25 is movable by the play. The connection terminal 25 can also be fixed by sandwiching the connection terminal 25 between the cover member 27 and the spacer 26. However, the connection terminal 25 is supported by the protrusion 412 through the through-hole 261 made in the spacer 26, whereby the connection terminal 25 is positioned in the axial direction with the guide member 24 as a reference. When the connection terminal 25 is supported on the spacer 26, size errors of both the guide member 24 and the spacer 26 affect positioning accuracy of the connection terminal 25. Consequently, the positioning accuracy of the connection terminal 25 in the axial direction can be improved in the stator 2 when the connection terminal 25 is supported on the protrusion 412.

Bolts 273a are inserted in the two second through-holes 272 of the cover member 27. The lower end of the bolt 273a is joined to a nut 273b fixed to the lower plate 41. Consequently, the cover member 27 and the guide member 24 are fixed to each other with the spacer 26 interposed therebetween. That is, the terminal case is attached to the guide member 24. A nut holding portion 413 is provided in the lower plate 41, the nut holding portion 413 being a cavity having the same shape as the nut 273b and including a lateral hole and an upper hole. The nut 273b is press-fitted and fixed to the nut holding portion 413 from the lateral hole.

The nut 273b may be formed integrally with the guide member 24. In this case, the fixing member is constructed with the bolt 273a and the nut 273b.

As described above, the motor 1 is exposed to the refrigerant at the time of driving, so that the material for the motor 1 is restricted. That is, depending on a relationship between the refrigerant and a resin component, sometimes the resin component is chemically changed by the refrigerant to generate fine particles. Sometimes the fine particles clogs a refrigerant passage of the compressor 100. For this reason, as described above, PPS, LCP, and PBT excellent in refrigerant resistance such that such resin component hardly changes are used for the guide member 24, the spacer 26, and the cover member 27 as described above. In particular, although PPS and LCP are excellent in refrigerant resistance, PPS and LCP are hard and brittle. Consequently, when a snap-fit fastening method in which the members are elastically deformed and hooked is adopted, it is necessary to increase a size of a hook portion compared to a material typically used (for example, PA66). As a result, the size in the axial direction of the entire stator increases. Additionally, PPS and LCP are also unsuitable for thermal welding. From the above, sometimes a conventional fastening method such as snap-fit or thermal welding cannot be used in fixing the cover member 27. In such cases, the use of the fixing member constructed with the bolt 273a and the nut 273b as in the present embodiment can fix the terminal case including the connection terminal 25 to the guide member 24 without impairing the refrigerant resistance.

The connection terminal 25 can be disposed so as to insert the external connection terminal in the axial direction, together with the terminal case including the spacer 26 and the cover member 27, without protruding from the annular region surrounded by an innermost diameter of the teeth 212 and an outermost diameter of the core back 211 in planar view.

A manufacturing procedure of the stator 2 will be described below.

In manufacturing the stator 2, first the insulator 22 is attached to the stator core 21 (step S1). Six conducting wires are wound around the insulating portions 221 covering the teeth 212 in the insulator 22. Consequently, twelve coils 23 are formed (step S2). The twelve lead wires 8 constructed with two U-phase common lines 8uc, two V-phase common lines 8vc, two W-phase common lines 8wc, two U-phase feeder lines 8up, two V-phase feeder lines 8vp, and two W-phase feeder lines 8wp extend from the twelve coils 23.

The lead wires 8 are drawn from the coil 23 to the radial outside through the notches 228 of the insulator 22, and temporarily retreated (step S3).

Subsequently, the leading ends of one U-phase common line 8uc, one V-phase common line 8vc, and one W-phase common line 8wc are bundled and welded together. Consequently, the U-phase common line 8uc, the V-phase common line 8vc, and the W-phase common line 8wc are electrically connected to form the neutral point 80 in one of the coil groups 230. Similarly, the neutral point 80 is formed for the other coil group 230 (step S4).

Subsequently, the guide member 24 is attached to the insulator 22 (step S5). In this case, first the guide member 24 is disposed on the radial inside of the upper outer wall 226. The bottom face of the lower plate 41 of the guide member 24 is placed on the step face of the upper outer wall 226. At this point, the lower ends of the plurality of notches 228 provided in the upper outer wall 226 are located below the bottom face of the lower plate 41. The plurality of lead wires 8 are temporarily retreated to the radial outside through the gap between the bottom face of the lower plate 41 and the lower end of the notch 228. Consequently, the guide member 24 is disposed on the radial inside of the upper outer wall 226 without interfering with the plurality of lead wires 8.

Figure 10:
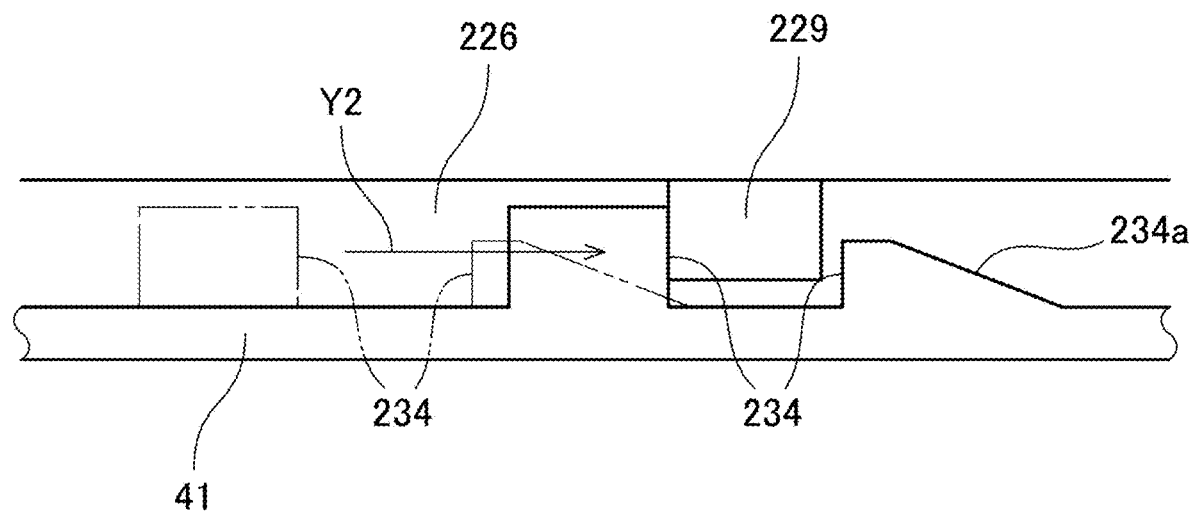
FIG. 10 is a view illustrating a projection and a pair of regulating faces when the projection and the pair of regulating faces are viewed from a radially inside.

As illustrated in FIG. 6, at the upper end of the upper outer wall 226 of the insulator 22, projections 229 projecting toward the radial inside are provided at three positions in the circumferential direction with a space. On the other hand, on the top face of the outer circumferential edge of the lower plate 41, a pair of regulating faces 234 opposed to each other in the circumferential direction is provided at three positions with a space in the circumferential direction. When the guide member 24 is disposed in the insulator 22, the guide member 24 is moved to the lower side in the axial direction while each projection 229 is aligned with the position of the notch 417 of the lower plate 41, and the guide member 24 is disposed on the radial inside of the upper outer wall 226. At this time, a positional relationship between the projection 229 and the pair of regulating faces 234 is indicated by a two-dot chain line in FIG. 10. FIG. 10 is a view illustrating the projection 229 and the pair of regulating faces 234 during the rotation when the projection 229 and the pair of regulating faces 234 are viewed from the radial inside. Then, the guide member 24 is rotated clockwise about the central axis 9. That is, when the guide member 24 is rotated in the direction of an arrow Y2, the projection 229 is fitted between the pair of regulating faces 234 as illustrated in FIG. 6 and FIG. 10. The positional relationship between the projection 229 and the pair of regulating faces 234 at this time is indicated by a solid line in FIG. 10. Consequently, the relative movement in the circumferential direction of the projection 229 is restricted by the pair of regulating faces 234.

Such engagement between the projection 229 and the pair of regulating faces 234 is performed at three positions in the circumferential direction. Consequently, the positional displacement of the guide member 24 in the circumferential direction with respect to the insulator 22 is prevented. As illustrated in FIG. 10, the bottom face of the projection 229 faces the top face of the lower plate 41 while contacting with the top face of the lower plate 41, or the bottom face of the projection 229 faces the top face of the lower plate 41 with a slight gap interposed therebetween. Consequently, the upward positional displacement of the guide member 24 is prevented. An inclined face 234a is provided in the vicinity of one (the regulating face 234 on the right side in FIG. 10) of the pair of regulating faces 234. The inclined face 234a smoothly guides the projection 229 to the regulating face 234 during the rotation of the guide member 24.

As described above, in the present embodiment, the guide member 24 is fixed to the insulator 22 by rotating the guide member 24 in a horizontal attitude. In this way, as compared with the case that another fixing method such as snap fitting is adopted, the guide member 24 can easily be fixed while suppressing the size in the axial direction of the guide member 24 with respect to the insulator 22. A projection may be provided on the lower plate 41 of the guide member 24, and a pair of regulating faces that restricts the movement in the circumferential direction of the projection may be provided on the upper outer wall 226 of the insulator 22.

When the guide member 24 is fixed to the insulator 22, the U-phase common line 8uc, the V-phase common line 8vc, and the W-phase common line 8wc among the plurality of lead wires 8 retreated to the radial outside are bundled and weld together to form the neutral point 80, returned to the radial inside, and drawn out from the notch 417. The U-phase common line 8uc, the V-phase common line 8vc, and the W-phase common line 8wc are wound around the inner wall 42. The two neutral points 80 exist, so that this work is performed for each neutral point 80. Consequently, the U-phase common line 8uc, the V-phase common line 8vc, and the W-phase common line 8wc are disposed in the lead wire accommodation space 40 (step S6).

The winding direction of the lead wire 8 in steps S6 and S9 to be described later is preferably identical to the rotation direction of the guide member 24 in step S5. In this way, even if the guide member 24 receives circumferential force due to friction with the lead wire 8, the higher regulating face 234 (the other one of the pair of regulating faces 234 on the left side in FIG. 10) abuts on the projection 229, whereby the guide member 24 does not easily come off from the insulator 22.

Figure 11:
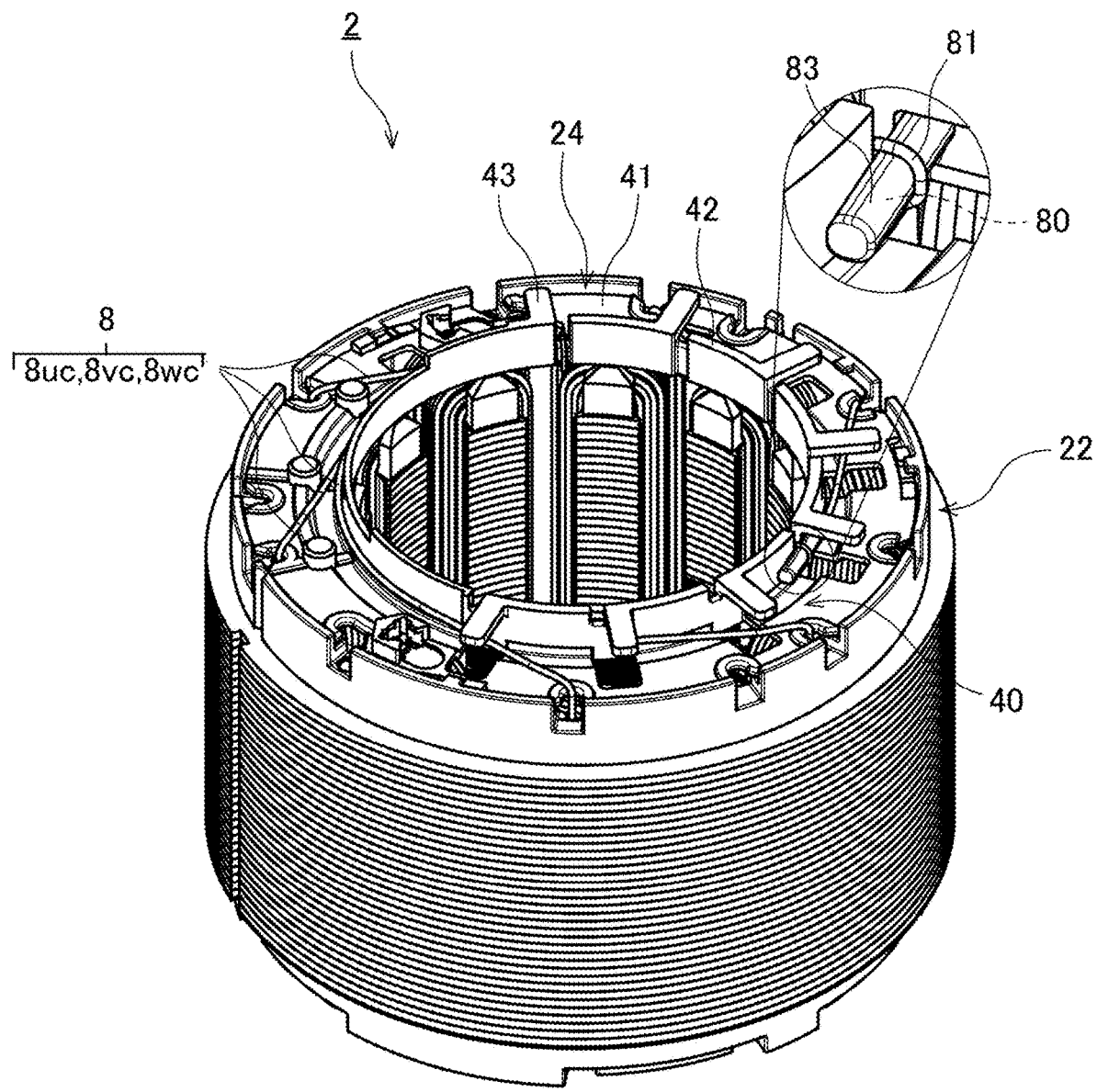
FIG. 11 is a perspective view of the stator in step S7.

Subsequently, the neutral point 80 provided at the leading ends of the U-phase common line 8uc, the V-phase common line 8vc, and the W-phase common line 8wc is fixed to a part of the guide member 24 (step S7). FIG. 11 is a perspective view of the stator 2 in step S7. In the present embodiment, as in the enlarged view illustrated in FIG. 11, the neutral point 80 is fixed to the inner wall 42 of the guide member 24 using the first fastening member 81 such as a braid. However, instead of the braid, another member such as a clamping band may be used as the first fastening member 81. With no use of the first fastening member 81, the neutral point 80 may be fitted in and fixed to a holding portion, such as a slit, which is provided in the guide member 24. The first fastening member 81 may be eliminated in the case that the sufficient frictional force exists between the common lines 8uc, 8vc, and 8wc of the respective phases and between portions of the lead wire accommodation space 40 by disposing the common lines 8uc, 8vc, and 8wc of each phase in the lead wire accommodation space 40 with no gap.

The neutral point 80 may be fixed to the lower plate 41 or the upper plate 43. The neutral point 80 may be fixed to the insulator 22.

Subsequently, the insulating tube 83 is attached to the feeder lines 8up, 8vp, and 8wp of the respective phases. The two U-phase feeder lines Sup are bundled and welded to the connection portion 25a of the connection terminal 25. The other two V-phase feeder lines 8vp and the two W-phase feeder lines 8wp are also bundled and welded to the connection terminal 25. Consequently, the feeder lines 8up, 8vp, and 8wp of the respective phases are connected to the three connection terminals 25 (step S8).

Then, the U-phase feeder line 8up, the V-phase feeder line 8vp and the W-phase feeder line 8wp retreated to the radial outside are returned to the radial inside together with the connection terminal 25, and drawn out from the notch 417. The U-phase feeder line 8up, the V-phase feeder line 8vp, and the W-phase feeder line 8wp are wound around the inner wall 42. Consequently, the U-phase feeder line 8up, the V-phase feeder line 8vp, and the W-phase feeder line 8wp are disposed in the lead wire accommodation space 40 (step S9).

Figure 12:
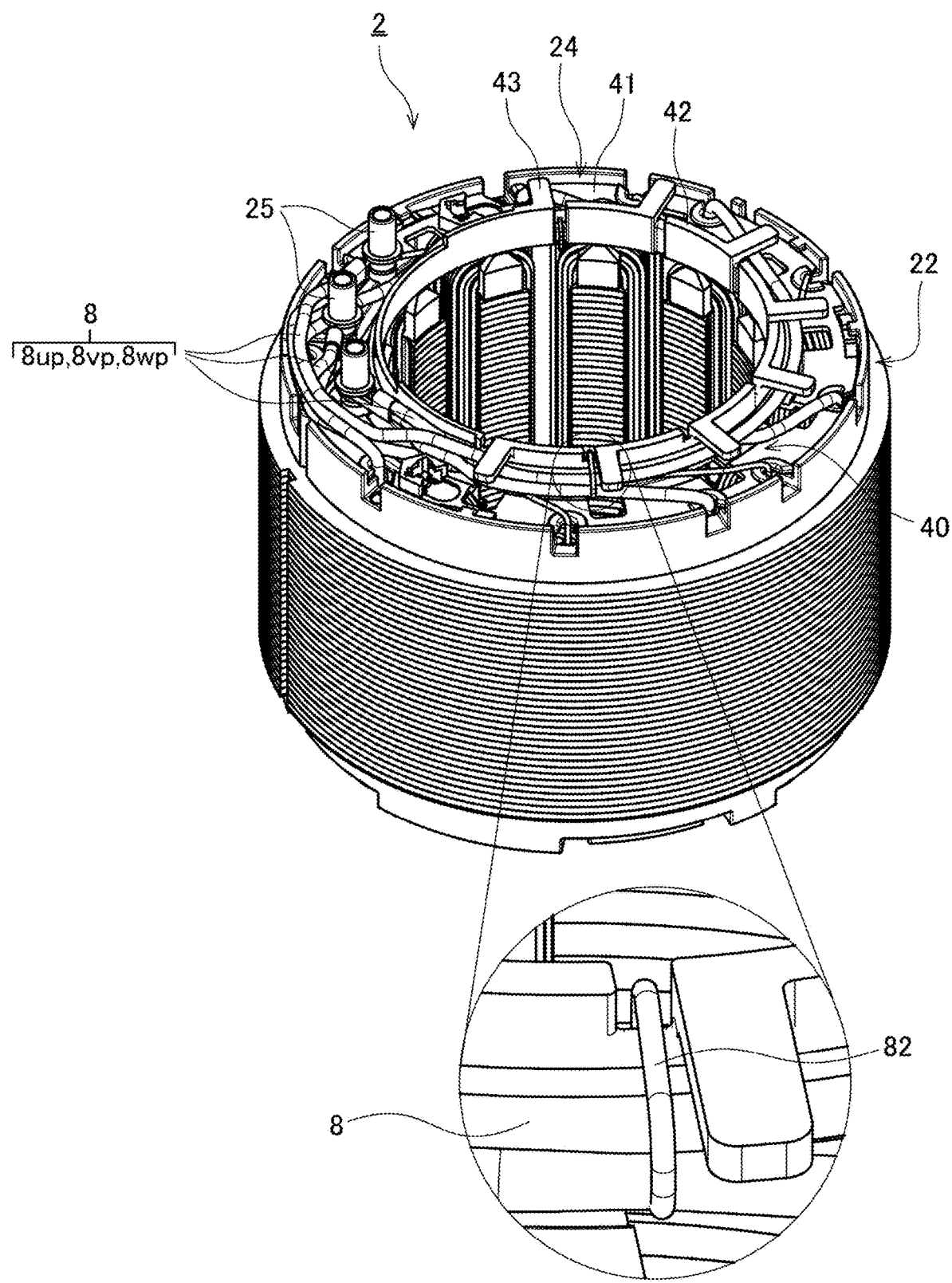
FIG. 12 is a perspective view of the stator in step S10.

Subsequently, the U-phase feeder line 8up, the V-phase feeder line 8vp, and the W-phase feeder line 8wp are fixed to a part of the guide member 24 (step S10). FIG. 12 is a perspective view of the stator 2 in step S10. In the present embodiment, as in the enlarged view illustrated in FIG. 12, the U-phase feeder line 8up, the V-phase feeder line 8vp, and the W-phase feeder line 8wp are fixed to the inner wall 42 of the guide member 24 using the second fastening member 82 such as the braid. However, instead of the braid, another member such as a clamping band may be used as the second fastening member 82. With no use of the second fastening member 82, the U-phase feeder line 8up, the V-phase feeder line 8vp, and the W-phase feeder line 8wp are fitted in and fixed to the holding portion, such as a slit, which is provided in the guide member 24. The second fastening member 82 may be eliminated in the case that the sufficient frictional forces exists between the feeder lines 8up, 8vp, and 8wp and between portions of the lead wire accommodation space 40 by disposing the feeder lines 8up, 8vp, and 8wp in the lead wire accommodation space 40 with no gap.

The U-phase feeder line 8up, the V-phase feeder line 8vp, and the W-phase feeder line 8wp may be fixed to the lower plate 41 or the upper plate 43. The U-phase feeder line 8up, the V-phase feeder line 8vp, and the W-phase feeder line 8wp may be fixed to the insulator 22.

Then, after the spacer 26 is disposed on the guide member 24, each connection terminal 25 is temporarily placed on the protrusion 412 of the lower plate 41 through the through hole 261. Then, the cover member 27 is disposed on the guide member 24 so as to cover the connection terminal 25, and fixed using the bolt 273a. The nut 273b is previously fixed to the nut holding portion 413 (step S11).

As described above, in the motor 1, the conducting wire of the coil 23 is directly disposed on the guide member 24. Therefore, the connecting work is not required as compared with the case that the lead wire 8 is connected to another lead wire different from the coil 23, so that assembly workability is good and there is little fear of connection failure. Additionally, because the lead wire accommodation space 40 of the guide member 24 is formed into the arc shape, the lead wire accommodation space 40 is present in the vicinity of the lead wire 8 even if the lead wires 8 are drawn from any portion of the stator core 21, so that the lead wire 8 can be easily disposed.

Although the exemplary embodiment of the present invention is described above, the present invention is not limited to the above embodiment.

Figure 13:
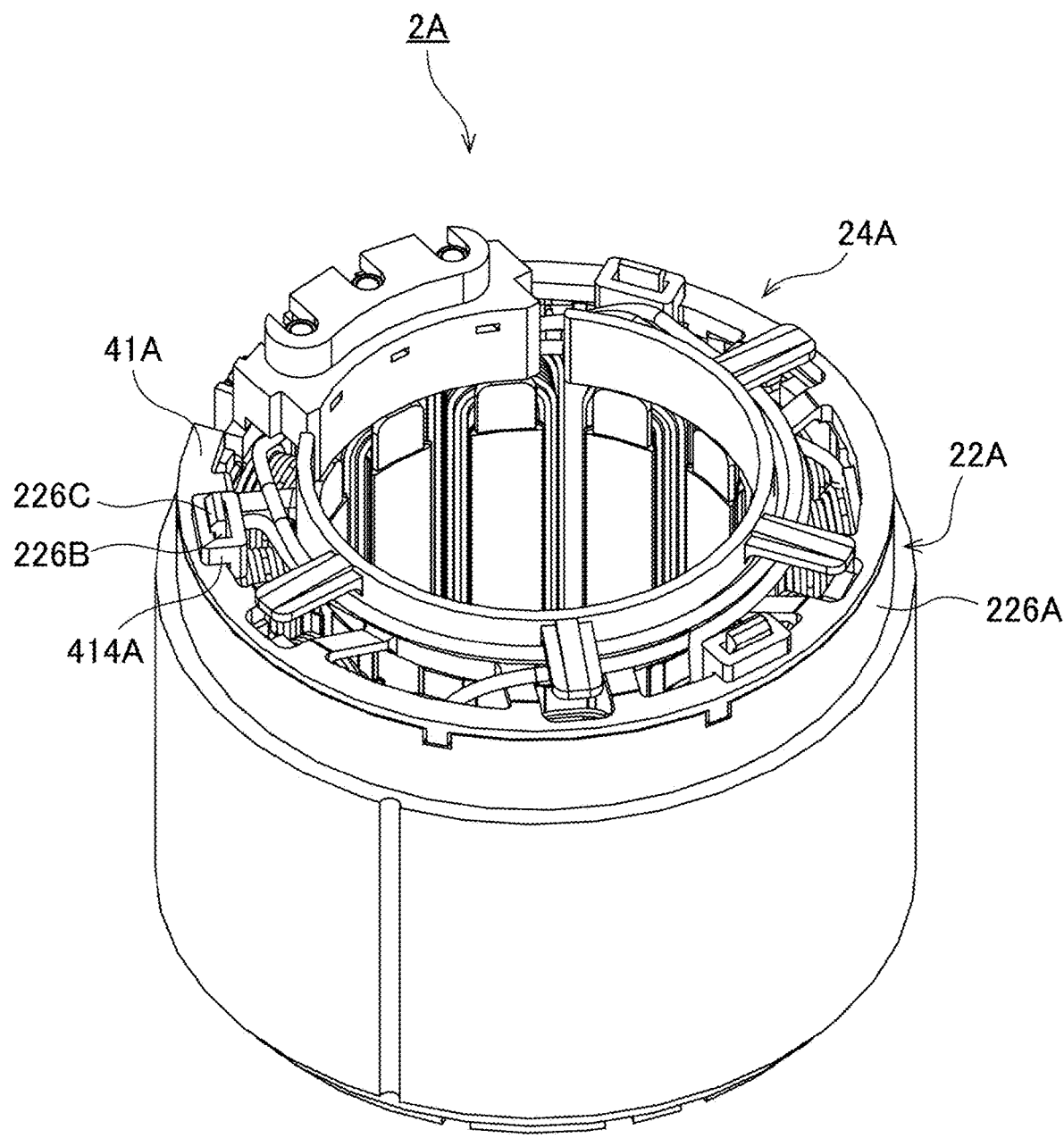
FIG. 13 is a perspective view of a stator according to a modification.

FIG. 13 is a perspective view of a stator 2A according to a modification. In the example of FIG. 13, a guide member 24A is attached to the top face of an upper outer wall 226A of an insulator 22A by snap fitting. Three receiving portions 414A are provided on the outer circumference of a lower plate 41A of the guide member 24A. The receiving portion 414A includes a through-hole in the axial direction. On the other hand, three projections 226B extending upward are provided on the top face of the upper outer wall 226A of the insulator 22A. A claw 226C extending to the radial outside is provided at the leading end of each projection 226B.

The three projections 226B are inserted in the three receiving portions 414A. The claw 226C of each projection 226B is hooked on the top face of the receiving portion 414A. Consequently, the bottom face of the claw 226C and the top face of the receiving portion 414A are opposed to each other while contacting with each other in the axial direction, or the bottom face of the claw 226C and the top face of the receiving portion 414A are opposed to each other with a slight gap interposed therebetween in the axial direction. The bottom face of the lower plate 41A contacts with the top face of the upper outer wall 226A. Consequently, the guide member 24A is fixed to the insulator 22A.

As compared with the above embodiment, this example is suitable for the insulator 22A and the guide member 24A in the case that a resin material which is easily elastically deformable can be used, or in the case that a size restriction in the axial direction of the stator 2A is loose.

The extending direction of the claw 226C may be the radial direction or the circumferential direction. A projection including a claw may be provided on the upper outer wall 226A of the insulator 22A, and a receiving portion in which the projection is inserted may be provided on the lower plate 41A of the guide member 24A.

In the example of FIG. 13, the hole 410A of the lower plate 41A is largely opened in the circumferential direction. In this example, as compared with the above embodiment, the guide member 24A is further separated from the coil 23 to ensure an insulating distance, so that the hole 410A can be enlarged.

The radial inside of the lower plate 41A is inclined downward toward the central axis 9. Consequently, the same effect as that of the groove 411 of the above embodiment can be obtained.

In the above embodiment, the upper plate 43 is eliminated in a part in the circumferential direction of the guide member 24. The terminal case is disposed in a part of the circumferential direction. However, the upper plate 43 may be provided around the entire circumference, and the lead wire accommodation space may be formed into the annular shape. With this configuration, the terminal case can be disposed on the upper side of the lead wire accommodation space, or the connection terminal can be drawn by another method.

In the above embodiment, the terminal case is attached to the guide member 24. Alternatively, the terminal case may be attached to the insulator. The terminal case may be attached to both the guide member 24 and the insulator 22.

In the above embodiment, the motor for the compressor is described. However, the stator and the motor of the present invention may be used for applications other than the compressor. For example, the stator and the motor of the present invention may be used for a power steering of an automobile, an engine cooling fan, or an oil pump. The motor of the present invention may be mounted on a home electric appliance, an office automation instrument, a medical instrument or the like to generate various kinds of driving force.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A stator comprising:
    a stator core including an annular core back surrounding a vertically extending central axis and a plurality of teeth extending from the core back to a radial inside;
    a plurality of coils constructed with conducting wires wound around the teeth;
    an insulator insulating the stator core from the coil;
    a plurality of lead wires extending upward from the coil; and
    a guide member supporting the lead wire on an upper side of the coil,
    wherein the guide member is an insulating body including:
        a lower plate spreading annularly around the central axis;
        an inner wall extending upward from an inner circumference of the lower plate; and
        an upper plate extending from the inner wall to a radial outside,
    a single lead wire accommodation space exists on an upper side of the lower plate, a lower side of the upper plate, and a radial outside of the inner wall, and
    the plurality of lead wires are disposed in a circumferential direction along the inner wall in the lead wire accommodation space.

2. The stator according to claim 1, wherein
    the plurality of coils include:
        a U-phase coil to which U-phase current is supplied;
        a V-phase coil to which a V-phase current is supplied; and
        a W-phase coil to which a W-phase current is supplied,
    the plurality of lead wires include:
        a U-phase common line drawn from the U-phase coil;
        a V-phase common line drawn from the V-phase coil; and
        a W-phase common line drawn from the W-phase coil, and
    a neutral point, which is a connection portion of the U-phase common line, the V-phase common line, and the W-phase common line, is disposed on the upper side of the lower plate.

3. The stator according to claim 2, further comprising a first fastening member fixing the neutral point to a part of the guide member.

4. The stator according to claim 1, further comprising a second fastening member fixing each of a U-phase feeder line, a V-phase feeder line, and a W-phase feeder line to a part of the guide member
    Wherein
    the plurality of coils include:
        a U-phase coil to which a U-phase current is supplied;
        a V-phase coil to which a V-phase current is supplied; and
        a W-phase coil to which a W-phase current is supplied,
    the plurality of lead wires includes:
        the U-phase feeder line drawn from the U-phase coil;
        the V-phase feeder line drawn from the V-phase coil; and
        the W-phase feeder line drawn from the W-phase coil.

5. The stator according to claim 1, wherein the guide member includes a plurality of the upper plates radially arranged with respect to the central axis.

6. The stator according to claim 1, further comprising a plurality of connection terminals supported by the guide member in order to be connected to an external connection terminal provided separately from the motor,
    wherein at least a part of the plurality of lead wires is connected to the connection terminal.

7. The stator according to claim 6, further comprising a terminal case for accommodating the connection terminal so that the connection terminal can be connected to the external connection terminal in an axial direction,
    wherein the terminal case is attached to at least one of the guide member and the insulator.

8. The stator according to claim 7, wherein the terminal case is disposed in an annular region surrounded by an innermost diameter of the teeth and an outermost diameter of the core back.

9. The stator according to claim 7, wherein
the terminal case includes:
- a case bottom disposed above at least a part of the plurality of lead wires; and
- a case body forming an accommodation space accommodating the connection terminal together with the case bottom, and
the case bottom includes an accommodation groove in which the connection terminal and the lead wire connected to the connection terminal are disposed in a predetermined portion.

10. The stator according to claim 9, wherein the connection terminal abuts on the lower plate and the case body.

11. The stator according to claim 7, further comprising a fixing member that fixes the terminal case to the guide member.

12. The stator according to claim 1, wherein
the insulator includes:
- an insulating portion interposed between each of the teeth and the coil;
- an annular portion covering at least a part of the top face of the core back; and
- an outer wall extending upward from the annular portion,
the bottom face of the lower plate is located below the top face of the outer wall,
one of the lower plate and the outer wall includes a projection, and
the other of the lower plate and the outer wall includes a pair of regulating faces restricting movement of the projection in the circumferential direction.

13. The stator according to claim 12, wherein
the projection is provided on the outer wall so as to extend radially inward,
a pair of protrusions protruding upward is provided separately from each other in the circumferential direction on the top face of the lower plate, and
the pair of regulating faces is faces opposed to each other in the circumferential direction of the pair of protrusions.

14. The stator according to claim 1, wherein
the insulator includes:
- an insulating portion interposed between each of the teeth and the coil;
- an annular portion covering at least a part of the top face of the core back; and
- an outer wall extending upward from the annular portion,
the bottom face of the lower plate contacts with the top face of the outer wall,
one of the lower plate and the outer wall includes a pawl extending in the axial direction, and
the other of the lower plate and the outer wall includes a receiving portion restricting movement of the pawl in the axial direction.

15. The stator according to claim 9, wherein
the outer wall includes a plurality of first notches, which are recessed downward from an upper end and pierce in the radial direction, and
the lower end of the first notch is located below the bottom face of the lower plate to include a gap where the lead wire can be inserted between the lower end and the bottom face of the lower plate.

16. The stator according to claim 15, wherein
a plurality of second notches, which are recessed radially inwardly from the outer peripheral edge of the lower plate portion and pierce in the axial direction, are provided in a region of the lower plate, the region being opposed to the first notch in the radial direction, and
the lead wire is drawn through the second notch.

17. The stator according to claim 1, wherein
the lower plate includes at least one hole piercing in the axial direction, and
the hole and a gap formed between the circumferentially adjacent teeth overlap each other in the axial direction.

18. The stator according to claim 17, wherein the upper plate and the hole overlap each other in the axial direction.

19. The stator according to claim 18, wherein an area of the upper plate is smaller than an area of the hole when viewed in the axial direction.

20. The stator according to claim 1, wherein a material for the guide member is polyphenylene sulfide or a liquid crystal polymer.

21. The stator according to claim 1, the stator being used for a driving motor of an electric compressor.

22. A motor comprising:
the stator according to claim 1; and
a rotor disposed on a radial inside of the stator.

23. An electric compressor driven by the motor according to claim 22.

* * * * *